United States Patent [19]

Murakami et al.

[11] Patent Number: 5,270,110
[45] Date of Patent: Dec. 14, 1993

[54] FILM-FORMING ORGANOPOLYSILOXANE COMPOSITION

[75] Inventors: Ichiro Murakami; Hideyuki Motomura, both of Ichihara, Japan

[73] Assignee: Dow Corning Toray Silicon Co., Ltd., Tokyo, Japan

[21] Appl. No.: 51,419

[22] Filed: Apr. 23, 1993

Related U.S. Application Data

[62] Division of Ser. No. 728,452, Jul. 11, 1991, abandoned.

[30] Foreign Application Priority Data

Jul. 19, 1990 [JP] Japan .................. 2-191122

[51] Int. Cl.$^5$ ........................... B32B 7/12
[52] U.S. Cl. ......................... 428/355; 428/447
[58] Field of Search ................... 428/447, 355

[56] References Cited

U.S. PATENT DOCUMENTS

| | | | |
|---|---|---|---|
| 4,115,356 | 9/1978 | Hilliard | 528/18 |
| 4,122,127 | 10/1978 | Mikami et al. | 528/18 |
| 4,431,472 | 2/1984 | Höhl et al. | 528/901 |
| 4,595,610 | 6/1986 | Fey et al. | 528/21 |
| 4,673,750 | 6/1987 | Beers et al. | 528/18 |
| 4,973,623 | 11/1990 | Haugsby et al. | 528/34 |
| 4,996,112 | 2/1991 | Perrin et al. | 528/901 |
| 5,013,781 | 5/1991 | Koshii et al. | 528/34 |

FOREIGN PATENT DOCUMENTS 1-198840  7/1989  Japan .

*Primary Examiner*—Melvyn I. Marquis
*Assistant Examiner*—Karen A. Dean
*Attorney, Agent, or Firm*—Richard I. Gearhart

[57] ABSTRACT

A film-forming organopolysiloxane composition is disclosed which imparts an excellent releaseability and lubricity to the surface of various types of rubber materials. The composition comprises a solvent dispersion of
(a) 50 to 90 weight percent of a block organopolysiloxane copolymer;
(b) 2 to 50 weight percent of a compound selected from the group consisting of an organosilane or a partial hydrolyzate thereof;
(c) 4 to 40 weight percent of a mixture an epoxy group-containing organoalkoxysilane and an alkenyl group-containing organoacetoxysilane in a weight ratio of 1:9 to 9:1 or a condensation-reaction product thereof;
(d) 0.1 to 10 weight percent of an hydroxy or alkoxy terminated diorganopolysiloxane; and
(f) 0.1 to 10 weight percent of a condensation-reaction catalyst.

10 Claims, No Drawings

FILM-FORMING ORGANOPOLYSILOXANE COMPOSITION

"This is a divisional of copending application(s) Ser. No. 07/728,452 filed on 7/11/91" now 5,246,995.

The present invention relates to a film-forming organopolysiloxane composition which imparts an excellent releaseability and lubricity to the surface of various types of rubber materials.

BACKGROUND OF THE INVENTION

The following techniques are already known for imparting release and lubrication properties to the surfaces of various types of rubber materials:
(a) coating said surface with a strongly releasing, highly lubricating silicone oil or fluorine-type oil;
(b) coating and curing a releasing and lubricating silicone resin onto said surface.

However, the technique of applying a strongly releasing, highly lubricating oil suffers from the problem of the gradual decline in the effect of the coated oil due to its loss from the surface with the passage of time. In addition, with regard to the coating and curing of a releasing and lubricating silicone resin, the cured resin film thus obtained cannot follow or track the rubber material's elongation. This results in a pronounced tendency for cracking to occur on the surface of the rubber material during the expansion and contraction which accompanies its flexing. The releaseability and lubricity are then lost, and the external appearance is compromised at the same time. Thus, rubber materials which employ this approach cannot tolerate long-term application.

In order to solve these problems arising in the prior art, the present inventors have already proposed a film-forming organopolysiloxane composition made from a special organopolysiloxane composition (refer to Japanese Patent Application Number 01-198840 [198,840/89]). However, while this composition evidences good adherence to silicone rubbers and fluororubbers, its adherence for other organic rubbers is somewhat poor, and it does not always provide a satisfactory performance when such other organic rubbers are deployed in service accompanied by such actions as friction or flexing.

SUMMARY OF THE INVENTION

The present inventors carried out extensive research directed at solving the problems listed above. As a result, they discovered that the aforementioned problems, and particularly the problem of adhesion to organic rubbers other than silicone rubbers and fluororubbers, can be substantially solved by coating and curing an organopolysiloxane composition containing special organosilanes onto the surface of the rubber material. The present invention was achieved based on this discovery.

In other words, the present invention takes as its object the introduction of a film-forming organopolysiloxane composition which can form a self-bonding, rubbery elastic cured film that strongly adheres to various types of rubber materials, and particularly to organic rubbers other than silicone rubbers and fluororubbers, while imparting an excellent releaseability and lubricity to the surface of the coated rubber.

The present invention therefore relates to a film-forming organopolysiloxane composition for imparting releaseability and lubricity to the surface of various types of rubber materials, which characteristically consists of (a) 50 to 90 weight % of a block organopolysiloxane copolymer composed of
  (i) 10 to 80 weight % organopolysiloxane resin composed of

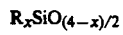

units, wherein R is a monovalent hydrocarbon group and x has an average value of 1.0 to 1.3.
  (ii) 2 to 30 weight % end-blocking siloxane units composed of

units, wherein $R^1$ is a silicon-bonded hydrolyzable functional group, $R^2$ is a monovalent hydrocarbon group, and y has an average value of 1.8 to 2.0, and
  (iii) 10 to 80 weight % straight-chain organopolysiloxane composed of

units, wherein $R^3$ is a monovalent hydrocarbon group, of which at least 80 mole % is methyl;
(b) 2 to 50 weight % of an organosilane having the general formula

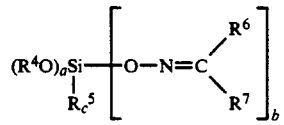

wherein $R^4$, $R^5$, $R^6$, and $R^7$ are monovalent hydrocarbon groups, a is zero, 1, 2, 3, or 4, b is zero, 1, 2, 3, or 4, a+b is 3 or 4, c is zero or 1, and a+b+c+d is 4 or the partial hydrolyzate thereof;
(c) 4 to 40 weight % of an epoxy group-containing organoalkoxysilane and an alkenyl group-containing organoacetoxysilane, or their condensation-reaction product;
(d) 0.1 to 10 weight % of a diorganopolysiloxane having an hydroxyl or an alkoxy group at the molecular terminal;
(e) zero to 10 weight % inorganic or organic micropowder;
(f) 0.1 to 10 weight % condensation-reaction catalyst; and
(g) an arbitrary quantity of organic solvent.

DETAILED DESCRIPTION OF THE INVENTION

To explain the preceding in greater detail, the principal or main component of the present invention is the block organopolysiloxane copolymer comprising the component (a) used by the present invention. This component comprises a block organopolysiloxane copolymer composed of
  (i) 10 to 80 weight % organopolysiloxane resin composed of

units, wherein R is a monovalent hydrocarbon group, for example, an alkyl group such as methyl, ethyl, or propul, etc., or an aryl group such as phenyl, etc.; and x has an averge value of 1.0 to 1.3, (ii) 2 to 30 weight % end-blocking siloxane unit composed of $$R^1_ySiR^2O_{(3-y)//2}$$

units, wherein $R^1$ is hydrolyzable functional group which is exemplified by alkoxy groups such as methoxy, ethoxy, propoxy, etc., by oxime groups such as methyl ethyl ketoxime, etc., and by the acetoxy group; $R^2$ is monovalent hydrocarbon group, for example, an alkyl group such as methyl, ethyl, or propylo, etc., or an aryl group such as phenyl, etc.; and y has an average value of 1.8 to 2.0, and (iii) 10 to 80 weight % straight-chain organopolysiloxane composed of $$R^3_2SiO$$

'units, wherein $R^3$ is a monovalent hydrocarbon group, for example, an alkyl group such as methyl, ethyl, or propyl, etc., or an aryl group such as phenyl, etc., of which at least 80 mole % is methyl.

This block organopolysiloxane copolymer is exemplified by block organopolysiloxane copolymers obtained by the condensation reaction of a dimethylpolysiloxane carrying silanol groups or alkoxy groups at the molecular chain terminals, with the hydrolysis condensate of a phenyltrialkoxysilane such as $C_6H_5Si(OCH_3)_3$, $C_6H_5Si(OC_2H_5)_3$. It may also be exemplified by block organopolysiloxane copolymers obtained by the condensation reaction of a dimethylpolysiloxane carrying silanol groups or alkoxy groups at the molecular chain terminals, with the hydrolysis condensate of a methyltrialkoxysilane such as $CH_3Si(OCH_3)_3$ or $CH_3Si(OC_2H_5)_3$.

With regard to the preparation of these organopolysiloxanes, the hydrolysis/condensation reaction of the aforementioned organosilanes is preferably gradually developed in a nonpolar solvent (for example, toluene, xylene, etc.) by the addition of the required quantity of water. Hydrochloric acid or the metal salt of octylic acid, naphthenic acid, etc., should be used as catalyst for the production of the block copolymer by the condensation reaction. The silicon-bonded hydrolyzable functional groups may be introduced through a partial hydrolysis of the aforementioned alkoxysilane in order to leave residual alkoxy groups or by running an end-blocking reaction during the condensation reaction by the addition of hydrolyzable silane.

The organosilane comprising the component (b) used by the present invention is a crosslinker for the organopolysiloxane comprising component (a), and it is the essential component for inducing adhesion between the composition of the present invention and various types of rubber materials. The groups $R^4$, $R^5$, $R^6$, and $R^7$ in the formula given above comprise monovalent hydrocarbon groups as exemplified by alkyl groups such as methyl, ethyl and propyl, and by alkenyl groups such as vinyl and allyl. The organosilane under consideration is exemplified by oxime group-containing organosilanes such as methyltris(methyl ethyl ketoxime)silane and vinyltris(methyl ethyl ketoxime)silane; organosilanes which contain both the oxime group and alkoxy group, such as methylmethoxydi(methyl ethyl ketoxime)silane and diethoxydi(methyl ethyl ketoxime)silane; alkoxy group-containing organosilanes such as methyltrimethoxysilane, methyltriethoxysilane and vinyltrimethoxysilane; as well as by mixtures of the preceding. This crosslinking component may also take the form of the partial hydrolysis-condensate obtained by a reaction in which the necessary quantity of water is added to an organosilane, as listed above.

The component (b) under consideration is added within the range of about 2 to 50 weight %, and preferably within the range of 5 to 40 weight %, relative to 50 to 90 weight % of component (a). The composition of the present invention will be inadequately crosslinked at an addition below about 2 weight %. On the other hand, an addition in excess of about 50 weight % causes the cured film to be hard and brittle, and it can then no longer track the rubber material's elongation.

The component (c) used by the present invention comprises an epoxy-containing organoalkoxysilane plus an alkenyl-containing organoacetoxysilane, or the condensation-reaction product therefrom. This is the critical component for improving adherence by the present invention's composition to organic rubbers. The addition of either of these silanes by itself will not lead to the development of an acceptable effect; rather, it is essential that they both be present in the composition simultaneously. This component should be added at about 4 to 40 weight %, and preferably at 5 to 15 weight %, relative to 50 to 90 weight % of component (a). In addition, the weight ratio between the epoxy-containing organoalkoxysilane and the alkenyl-containing organoacetoxysilane should fall within the range of about 1:9 to 9:1, but preferably falls within the range of 3:7 to 7:3.

The epoxy-containing organoalkoxysilane under consideration is exemplified by gamma-glycidoxypropyltrimethoxysilane, gamma-glycidoxypropyltriethoxysilane and beta-(3,4-epoxycyclohexyl)ethyltrimethoxysilane. The alkenyl-containing organoacetoxysilane is exemplified by vinyltriacetoxysilane and allyltriacetoxysilane. Component (c) may take the form of a mixture of epoxy-containing organoalkoxysilane and alkenyl-containing organoacetoxysilane. but it may also take the form of the product obtained from the preliminary reaction of these two compounds. This preliminary reaction product can be readily obtained, for example, by heating the mixture of epoxy-containing organoalkoxysilane and alkenyl-containing organoacetoxysilane at a temperature above the ambient temperature.

The diorganopolysiloxane comprising the component (d) employed by the present invention is the component which functions to endow the composition of the present invention with release and lubrication properties. In order for this diorganopolysiloxane to react with component (a) and/or component (b), it must carry a hydroxyl group or alkoxy group (e.g., methoxy, ethoxy, propoxy, etc.) at the molecular terminal. The main chain of this diorganopolysiloxane will generally consist of polydimethylsiloxane, but a portion of these methyl groups may be replaced by alkyl groups such as ethyl, propyl, etc.; by aromatic hydrocarbon groups such as phenyl, styryl, etc.; or by substituents which carry reactive functional groups such as the epoxy group or amino group.

This diorganopolysiloxane is exemplified by dimethylhydroxysiloxy-terminated dimethylpolysiloxanes, dimethylhydroxysiloxy-terminated dimethylsiloxane-methylphenylsiloxane copolymers, dimethylpolysiloxanes blocked at one molecular chain terminal by the dimethylhydroxysiloxy group and blocked at the other molecular chain terminal by the trimethylsiloxy group, dimethylmethoxysiloxy-terminated dimethylpolysiloxanes, and dimethylmethoxysiloxy-terminated dimethylsiloxane-methylphenylsiloxane copolymers.

The component (d) under consideration should be added at about 0.1 to 10 weight %, and preferably at 0.1 to 5 weight %, per 50 to 90 weight % of component (a).

The optional inorganic or organic micropowder comprising the component (e) used by the present invention functions to provide a further increase in the release and lubrication properties of the composition according to the present invention, and this component is added as necessary when higher levels of performance are required. By imparting roughness to the surface of the resulting cured film, the inorganic or organic micropowder reduces the area of contact with any impinging body and thus provides a further improvement in the release and lubrication properties. No specific restriction applies to the particle diameter of the micropowder as long as roughness can be imparted to the cured film, but particle diameters below 5 micrometers are typically used. The material comprising this component should not dissolve or swell in the organic solvent used in the composition according to the present invention, described infra. Nor should the particles aggregate during long-term storage. This component (e) is exemplified by such inorganic micropowders as talc, silica, bentonite, and the like, and by such organic micropowders as polyethylene micropowder, fluororesin micropowder and silicone resin micropowder.

The component (e) under consideration should be added at a level of up to about 10 weight %, and preferably at 0.5 to 5 weight %, relative to 50 to 90 weight % of component (a).

The condensation-reaction catalyst comprising the component (f) used by the present invention functions to promote or accelerate curing by the composition of the present invention. The condensation-reaction catalyst under consideration is exemplified by organometallic catalysts such as dibutyltin diacetate, dibutyltin dilaurate, dioctyltin dilaurate, dibutyltin dioctoate, zinc naphthenate, cobalt naphthenate, tin octylate, cobalt octylate, zirconium naphthenate, zirconium octylate and tetrabutyl orthotitanate, and by amine catalysts (excluding organosilicon compounds) such as diethanolamine, triethanolamine, and the like.

This component should be added at about 0.1 to 10 weight %, and preferably at 0.3 to 5 weight %, relative to 50 to 90 weight % of component (a).

The organic solvent comprising the component (g) employed by the present invention functions to dissolve or disperse the preceding components (a) through (f) and thus functions to facilitate and support the uniform coating or application of the present invention's composition on the surface of the rubber material. This organic solvent is exemplified by aromatic hydrocarbons such as toluene, xylene and benzene; by aliphatic hydrocarbons, such as n-hexane, n-heptane, rubber volatiles and industrial-purpose gasoline; by chlorinated hydrocarbons, such as carbon tetrachloride, 1,1,1-trichloroethane and perchloroethylene; and by ketone organic solvents, such as methyl ethyl ketone and methyl isobutyl ketone.

Since this component functions to facilitate uniform application onto the surface of the rubber material by dissolving or dispersing components (a) through (f), its quantity of addition is freely selectable. However, it should generally be used within the range of 40 to 90 weight %, and preferably within the range of 60 to 80 weight %, of the total film-forming organopolysiloxane composition of the present invention.

In addition to the components (a) through (g) as described hereinbefore, the composition according to the present invention may as necessary or desired, contain colorants, such as dyes, pigments, and the like, as long as the object of the present invention is not compromised.

When applied to any of various types of rubber materials, the composition according to the present invention as described above strongly adheres to the rubber material and endows the surface of same with durable release and lubrication properties. The composition according to the present invention may be very simply applied onto the surface of various types of rubber materials by such coating techniques as spraying, brushing, immersion, or flow coating followed by standing as such, or by heating according to the circumstances, in order to bring about simultaneous curing and drying.

EXAMPLES

The present invention will be explained below in greater detail through illustrative examples, in which parts=weight parts, the viscosity is the value at 25 degrees Centigrade, and Ph=phenyl.

In the examples, the adherence was numerically evaluated based on the number of abrasions necessary to peel or separate the film, the releaseability was numerically evaluated based on the value of the peeling resistance, and the lubricity was numerically evaluated based on the dynamic friction coefficient. These measurement values were obtained by the following methods.

Peeling resistance

The film-forming organopolysiloxane composition was coated in a prescribed quantity on the surface of the particular rubber substrate and was then converted into the cured film by heating for the prescribed time in a hot-air circulation oven at the prescribed temperature. Using a 2 kg roller, polyester tape (Polyester Tape 31B from Nitto Denko Kabushiki Kaisha, Japan, width=4 cm) was pressed onto the surface of the cured film, and this assembly was allowed to stand as such for 1 hour and was then used as the measurement specimen.

Using a tensile tester, the tape was subsequently pulled off at a peel rate of 30 cm/minute and a peel angle of 180 degrees, and the force (g) required for peeling was measured.

Dynamic friction coefficient

A cured film of the film-forming organopolysiloxane composition was formed on the surface of the particular rubber substrate by the same method as for the peeling resistance test. An aluminum plate (5 cm×5 cm) was placed on the resulting surface to serve as the contact element. A load was placed on top of the plate such that the sum of the weight of the contact element and the weight of the load was 250 g. The contact element was then pulled horizontally at a sliding rate of 10 m/minute and the friction coefficient was calculated from the required pulling force.

EXAMPLE 1

A 60% toluene solution was prepared of a (methoxy+silanol)-containing polysiloxane resin composed of $PhSiO_{3/2}$ units, wherein Ph denotes a phenyl radical, by carrying out an hydrolysis by adding toluene and 2 moles of water to 1 mole of phenyltrimethoxysilane. To 23 weight parts of this solution were added 20 weight parts of a silanol-terminated dimethylpolysiloxane (viscosity=70 centistokes), 10 weight parts methyltrimethoxysilane, and 50 weight parts toluene for dilution. This was then condensation polymerized in the presence of a catalytic quantity of hydrochloric acid, and the produced water and methanol were distilled from the reaction system together with toluene. Toluene was then added to adjust the solids content and afford a solution (nonvolatiles=70%, viscosity=700 centistokes) of a (methoxy+silanol)-containing polysiloxane made up of phenylpolysiloxane blocks and dimethylpolysiloxane blocks. This was designated as resin A.

The following were then combined and mixed to afford a film-forming organopolysiloxane composition: 30 weight parts resin A. 10 weight parts methyltrimethoxysilane, 3 weight parts gamma-glycidoxypropyltrimethoxysilane, 3 weight parts vinyltriacetoxysilane, 0.5 weight parts silanol-terminated dimethylpolysiloxane (viscosity=14,000 centistokes), 0.2 weight parts dibutyltin diacetate, and 53.3 weight parts toluene.

This film-forming organopolysiloxane composition was poured onto a frame-equipped panel, allowed to stand for 1 day at room temperature, and then heated for 30 minutes at 150 degrees Centigrade to give a 2-mm thick cured sheet. A tensile elongation of 55% was measured on this cured product using the measurement method stipulated in JIS K 6301.

This composition was spray coated onto rubber plates (7 cm×15 cm×0.2 cm) as reported in Table 1, followed by standing for 30 minutes at room temperature and then heating for 30 minutes at 100 degrees Centigrade to afford the cured film. Bonding to the plate substrate was evaluated by rubbing with a fingernail, and the obtained results are reported in Table 1. For comparison, a film-forming organopolysiloxane composition was prepared by omitting the gamma-glycidoxypropyltrimethoxysilane and vinyltriacetoxysilane from the composition of Example 1. Bonding by this composition was evaluated as above, and these results are also reported in Table 1. In Table 1, a "+" indicates that the film was not peeled from the substrate when scraped with a fingernail, while an "x" indicates that the film was peeled.

TABLE 1

| substrates | present invention | comparison example |
|---|---|---|
| silicone rubber | + | + |
| fluororubber | + | + |
| urethane rubber | + | + |
| butyl rubber | + | + |
| natural rubber | + | X |
| chloroprene rubber | + | X |
| Hypalon rubber | + | + |
| ethylene/propylene rubber | + | X |
| nitrile rubber | + | + |
| styrene rubber | + | + |
| acrylic rubber | + | X |

Among the preceding, the peeling resistance value was measured on the surface of the coated samples for chloroprene rubber and acrylic rubber, and these results are reported in Table 2. For comparison, the peeling resistance value was measured on the corresponding rubber material itself, and this is reported in Table 2 in the comparison example column.

TABLE 2

| substrates | present invention | comparison example |
|---|---|---|
| peeling resistance (g/4 cm) | | |
| chloroprene rubber | 4 | 120 |
| acrylic rubber | 5 | 530 |

EXAMPLE 2

A mixture was prepared of 30 weight parts resin A from Example 1, 10 weight parts methyltris(methyl ethyl ketoxime)silane, 2 weight parts gamma-glycidoxypropyltrimethoxysilane, 2 weight parts vinyltriacetoxysilane, 0.5 weight parts silanol-terminated dimethylpolysiloxane (viscosity=80 centistokes), and 0.3 weight parts dibutyltin dilaurate. This mixture was diluted to 100 weight parts with a mixed solvent of n-heptane/methyl ethyl ketone (in a 4/1 weight ratio) to give a film-forming organopolysiloxane composition. The tensile elongation of this composition was 81% according to measurement as in Example 1. Following the procedure given in Example 1, this composition was flow-coated onto the surface of urethane rubber and ethylene/propylene rubber (EP rubber) and converted into the cured film, on which the peeling resistance and dynamic friction coefficient were then measured. The obtained results are reported in Table 3.

The comparison example column in Table 3 reports the results for measurement of the peeling resistance and dynamic friction coefficient directly on the urethane rubber and EP rubber without treatment.

TABLE 3

| substrates | present invention | comparison example |
|---|---|---|
| peeling resistance (g/4 cm) | | |
| urethane rubber | 6 | 1700 |
| EP rubber | 5 | 320 |
| dynamic friction coefficient | | |
| urethane rubber | 0.30 | 0.53 |
| EP rubber | 0.32 | 0.49 |

EXAMPLE 3

A film-forming organopolysiloxane composition was prepared by the addition of 0.5 weight parts bentonite to 100 weight parts of the film-forming organopolysiloxane composition from Example 2. This composition was evaluated for its release and lubrication properties as in Example 1, and the obtained results are reported in Table 4.

TABLE 4

| measurement value | substrates | |
|---|---|---|
| | silicone rubber | fluororubber |
| peeling resistance, g/4 cm | 0 | 0 |
| dynamic friction coefficient | 0.24 | 0.25 |

EXAMPLE 4

An adhesion evaluation was conducted as in Example 1, except that in the present case the 3 weight parts gamma-glycidoxypropyltrimethoxysilane and 3 weight parts vinyltriacetoxysilane used in Example 1 were replaced by a condensation-reaction product obtained from gamma-glycidoxypropyltrimethoxysilane and vinyltriacetoxysilane. This condensation-reaction product was obtained by maintaining the mixture of 1 mole gamma-glycidoxypropyltrimethoxysilane and 1 mole vinyltriacetoxysilane at 50 degrees Centigrade for 3 days. The obtained results are reported in Table 5. Another film-forming organopolysiloxane composition was similarly obtained from the composition of Example 3, but in this case without the addition of the gamma-glycidoxypropyltrimethoxysilane+vinyltriacetoxysilane condensation-reaction product. This composition was subjected to adhesion testing as above, and the obtained results are reported in the comparison example column in Table 5.

TABLE 5

| substrates | present invention | comparison example |
|---|---|---|
| silicone rubber | + | + |
| fluororubber | + | + |
| urethane rubber | + | + |
| butyl rubber | + | + |
| natural rubber | + | X |
| chloroprene rubber | + | X |
| Hypalon rubber | + | + |
| ethylene/propylene rubber | + | X |
| nitrile rubber | + | + |
| styrene rubber | + | + |
| acrylic rubber | + | X |

That which is claimed is:

1. A rubber substrate coated with a film-forming organopolysiloxane composition comprising an organic solvent dispersion of
  (a) 50 to 90 weight percent of a block organopolysiloxane copolymer composed of
    (i) 10 to 80 weight percent of an organopolysiloxane resin composed of

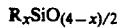
    $R_xSiO_{(4-x)/2}$ units, wherein R is a monovalent hydrocarbon group and x has an average value of 1.0 to 1.3,
    (ii) 2 to 30 weight percent of end-blocking siloxane unit composed of

    $R^1{}_yR^2SiO_{(3-y)/2}$ units, wherein $R^1$ is a silicon-bonded hydrolyzable group, $R^2$ is a monovalent hydrocarbon group and y has an average value of 1.8 to 2.0, and
    (iii) 10 to 80 weight percent of a straight-chain organopolysiloxane composed of

    $R^3{}_2SiO$ units, wherein $R^3$ is a monovalent hydrocarbon group, at least 80 mole percent of said $R^3$ group being methyl;
  (b) 2 to 50 weight percent of a compound selected from the group consisting of an organosilane having the general formula

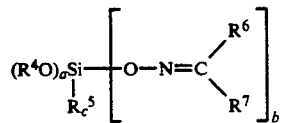

wherein $R^4$, $R^5$, $R^6$ and $R^7$ are monovalent hydrocarbon groups, a is zero, 1, 2, 3 or 4, b is zero, 1, 2, 3 or 4, a+b is 3 or 4, c is zero or 1 and a+b+c is 4, and a partial hydrolyzate of said organosilane;
  (c) 4 to 40 weight percent of a component selected from the group consisting of a mixture of an epoxy group-containing organoalkoxysilane and an alkenyl group-containing organoacetoxysilane in a weight ratio of 1:9 to 9:1 and a condensation-reaction product of said mixture;
  (d) 0.1 to 10 weight percent of a diorganopolysiloxane which is terminated with a group selected from the group consisting of an hydroxyl group and an alkoxy group; and
  (f) 0.1 to 10 weight percent of a condensation-reaction catalyst.

2. The rubber substrate coated with a composition according to claim 1, further comprising a filler selected from the group consisting of an organic micropowder and an inorganic micropowder, wherein said filler is present at a level of up to 10 weight percent based on the 50 to 90 weight percent of said block copolymer (a).

3. The rubber substrate coated with a composition according to claim 1, wherein R is selected from the group consisting of methyl and phenyl radicals.

4. The rubber substrate coated with a composition according to claim 3, wherein $R^2$ is a methyl radical and $R^1$ is selected from the group consisting of methoxy and ethoxy groups.

5. The rubber substrate coated with a composition according to claim 4, wherein said diorganopolysiloxane (d) is polydimethylsiloxane.

6. The rubber substrate coated with a composition according to claim 5, wherein said compound (b) is selected from the group consisting of methyltris(methyl ethyl ketoxime)silane, vinyltris(methyl ethyl ketoxime)silane, methylmethoxydi(methyl ethyl ketoxime)silane, diethoxydi(methyl ethyl ketoxime)silane, methyltrimethoxysilane, methyltriethoxysilane, vinyltrimethoxysilane, mixtures thereof and partial hydrolysis-condensates thereof.

7. The rubber substrate coated with a composition according to claim 6, wherein said epoxy group-containing organoalkoxysilane of said component (c) is selected from the group consisting of gamma-glycidoxypropyltrimethoxysilane, gamma-glycidoxypropyltriethoxysilane and beta-(3,4-epoxycyclohexyl)ethyltrimethoxysilane and said alkenyl group-containing organoacetoxysilane is selected from the group consisting of vinyltriacetoxysilane and allyltriacetoxysilane.

8. The rubber substrate coated with a composition according to claim 7, wherein said film-forming organopolysiloxane composition comprises an organic solvent dispersion of 50 to 90 weight percent of said block organopolysiloxane copolymer (a), 5 to 40 weight percent of said compound (b), 5 to 15 weight percent of said component (c), 0.1 to 5 weight percent of said diorganopolysiloxane (d), 0.3 to 5 weight percent of said condensation-reaction catalyst (f) and the weight ratio of said epoxy group-containing organoalkoxysilane to said alkenyl group-containing organoacetoxysilane is 3:7 to 7:3.

9. The rubber substrate coated with a composition according to claim 6, further comprising a filler selected from the group consisting of an organic micropowder and an inorganic micropowder, wherein said filler is present at a level of up to 10 weight percent based on the 50 to 90 weight percent of said block copolymer (a).

10. The rubber substrate coated with a composition according to claim 7, further comprising a filler selected from the group consisting of an organic micropowder and an inorganic micropowder, wherein said filler is present at a level of up to 10 weight percent based on the 50 to 90 weight percent of said block copolymer (a).

* * * * *